(12) United States Patent
Rathman (10) Patent No.: US 9,902,224 B2
(45) Date of Patent: Feb. 27, 2018

(54) TRAILER HITCH COUPLER LOCKING DEVICE

(71) Applicant: Winston Products, LLC, Cleveland, OH (US)

(72) Inventor: David Edward Birn Rathman, Cleveland, OH (US)

(73) Assignee: Winston Products, LLC, Cleveland, OH (US)

( * ) Notice: Subject to any disclaimer, the term of this patent is extended or adjusted under 35 U.S.C. 154(b) by 262 days.

(21) Appl. No.: 14/794,292

(22) Filed: Jul. 8, 2015

(65) Prior Publication Data

US 2016/0009152 A1 Jan. 14, 2016

Related U.S. Application Data

(60) Provisional application No. 62/021,888, filed on Jul. 8, 2014.

(51) Int. Cl.
*B60D 1/60* (2006.01)
*B60D 1/06* (2006.01)

(52) U.S. Cl.
CPC .................. *B60D 1/60* (2013.01); *B60D 1/06* (2013.01); *B60D 1/065* (2013.01)

(58) Field of Classification Search
CPC ............. B60D 1/60; B60D 1/06; B60D 1/065
USPC ....................................................... 280/507
See application file for complete search history.

(56) References Cited

U.S. PATENT DOCUMENTS

| | | | |
|---|---|---|---|
| 4,291,557 A | 9/1981 | Bulle et al. | |
| 4,774,823 A | 10/1988 | Callison | |
| D457,113 S | 5/2002 | Zapushek et al. | |
| 6,393,874 B1 * | 5/2002 | Zapushek ................ | B60D 1/60 280/507 |
| 6,698,256 B2 * | 3/2004 | Witchey ................... | B60D 1/02 280/507 |
| 7,273,223 B2 * | 9/2007 | Irgens ....................... | B60D 1/60 280/511 |
| 7,334,809 B2 * | 2/2008 | Coy .......................... | B60D 1/06 180/14.1 |

* cited by examiner

*Primary Examiner* — Jacob D Knutson
(74) *Attorney, Agent, or Firm* — Tucker Ellis LLP; Patrick F. Clunk (57) ABSTRACT

Provided is a trailer hitch coupler locking device for preventing the unauthorized use or theft of the trailer when stored or otherwise unattended. The locking device includes a lock mechanism configured to move a ratchet member from a first position where the ratchet member is engaged with an elongate member to a second position away from the elongate member where the members are disengaged. The elongate member is movable from a first position where an end of the elongate member is proximate a hitch ball to hold a trailer socket between the end of the elongate member and the hitch ball, and a second position where the end of the elongate member is spaced from the hitch ball to allow the trailer socket to be moved away from the locking device.

20 Claims, 8 Drawing Sheets

TRAILER HITCH COUPLER LOCKING DEVICE

RELATED APPLICATIONS

This application claims the benefit of U.S. Provisional Application No. 62/021,888 filed Jul. 8, 2014, which is hereby incorporated herein by reference.

FIELD OF INVENTION

The present invention relates generally to a locking device, and more particularly to a locking device connectable to a trailer for preventing theft of the trailer.

BACKGROUND

Trailers have numerous uses and applications and can be removably attachable to a vehicle for towing. A towing hitch assembly having a ball member can be removably connected to the vehicle and then connected to a trailer hitch coupler on the trailer to removably connect the vehicle to the trailer.

The trailer hitch coupler extends away from the trailer and includes a ball receiving socket. The ball receiving socket of the trailer hitch coupler is removable and attachable to the ball of the towing hitch assembly of the vehicle. The ball is normally held in the ball receiving socket of the trailer hitch coupler by a retention device that is operated by a suitable mechanism, such as a clasp, draw or a lever. Once the ball receiving socket receives the ball of the towing hitch, the retention device is actuated to engage the ball and positively mount the trailer hitch coupler to the towing hitch assembly. When the trailer is not being towed and is stored or otherwise unattended, the trailer hitch coupler is disengaged from the ball of the towing hitch assembly of the vehicle.

SUMMARY OF INVENTION

The present application provides a trailer hitch coupler locking device for preventing the unauthorized use or theft of the trailer when stored or otherwise unattended. The locking device includes a lock mechanism configured to move a ratchet member from a first position where the ratchet member is engaged with an elongate member to a second position away from the elongate member where the members are disengaged. The elongate member is movable from a first position where an end of the elongate member is proximate a hitch ball to hold a trailer socket between the end of the elongate member and the hitch ball, and a second position where the end of the elongate member is spaced from the hitch ball to allow the trailer socket to be moved away from the locking device.

According to an aspect, a trailer hitch coupler locking device configured to be connected to a socket of a trailer hitch coupler is provided, the locking device including a body having a first portion and a second portion, a connecting member extending from the first portion, an elongate member extending through an opening in the second portion, the elongate member having a first ratchet surface formed thereon, and a lock assembly disposed within the second portion and including a lock mechanism and a ratchet member having a second ratchet surface, wherein the lock mechanism is configured to move the ratchet member from a first position where the second ratchet surface is engaged with the first ratchet surface to a second position away from the elongate member where the first and second ratchet surfaces are disengaged, and wherein the elongate member is movable from a first position where an end of the elongate member is proximate the connecting member to hold the trailer socket between the end of the elongate member and the connecting member, and a second position where the end of the elongate member is spaced from the connecting member to allow the trailer socket to be moved away from the locking device.

According to another aspect, a trailer hitch coupler locking device configured to be connected to a socket of a trailer hitch coupler is provided, the locking device including a body having a base and a housing, a connecting member extending from the base, an elongate member extending through an opening in the housing and having a ratchet surface formed on a side thereof, the elongate member being movable relative to the housing, and a lock assembly disposed within the housing and including a lock mechanism and a ratchet member having a ratchet surface, the ratchet member being biased against the ratchet surface of the elongate member and being movable away from the elongate member to allow movement of the elongate member.

According to still another aspect, a trailer hitch coupler locking device configured to be connected to a socket of a trailer hitch coupler is provided, the locking device including, a body having a base portion and a housing, the housing having first and second openings perpendicular to one another, a connecting member extending from the base, an elongate member extending through the first opening in the housing, and a lock assembly disposed within the housing, the lock assembly including a lock mechanism disposed in the second opening in the housing and a ratchet member biased against the elongate member and being movable away from the elongate member to allow movement of the elongate member.

The foregoing and other features of the invention are hereinafter described in greater detail with reference to the accompanying drawings.

DETAILED DESCRIPTION

Turning now to FIGS. 1-8, a trailer hitch coupler locking device is shown generally at reference numeral 10. When a trailer is not being towed and is stored or otherwise unattended, a trailer hitch coupler on the trailer is disengaged from a ball of the towing hitch assembly of a vehicle. The locking device 10 is connectable to a socket of the trailer hitch coupler to prevent a ball of a towing hitch assembly from being coupled to the trailer, thereby preventing unauthorized use or theft of the trailer when stored or otherwise unattended. When the user desires to use the trailer, the locking device 10 is removed from the socket and the trailer coupled to the user's vehicle.

The locking device 10 may be formed, all or in part, of any suitable material, such as ferrous or non-ferrous metal, aluminum, zinc or plastic. An insert or cover constructed of a rubber, vinyl or other non-slipping or protective material may be provided on the locking device 10 to prevent slippage of, or damage by, the locking device.

Figure 14:
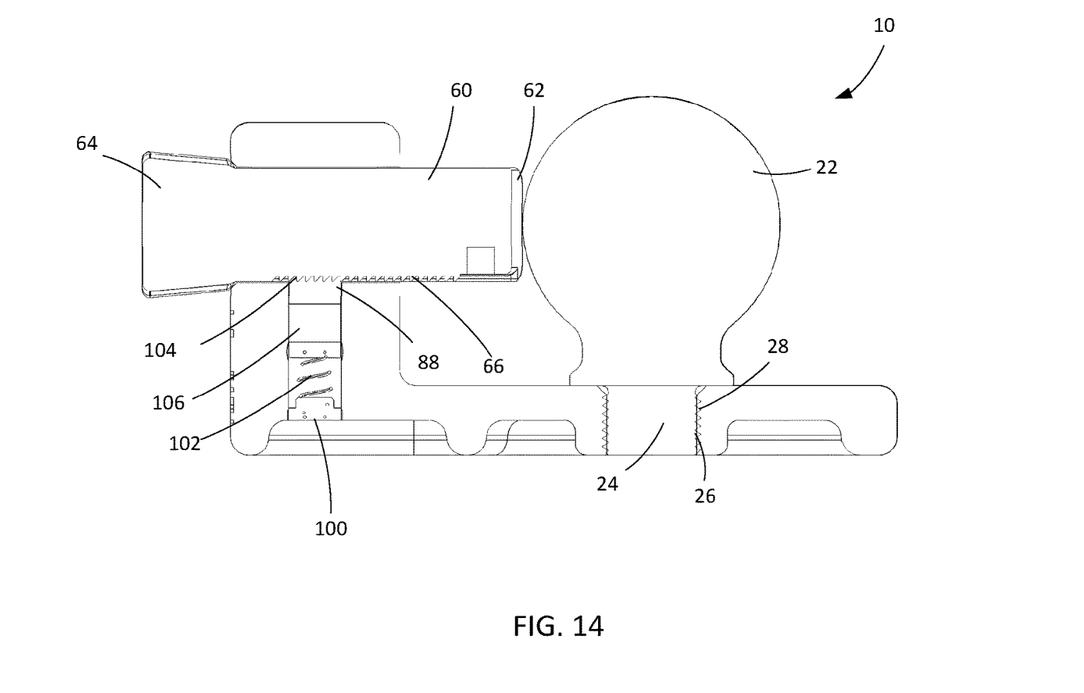
FIG. 14 is a cross-sectional view of the locking device in a locked position taken about line 14-14 in FIG. 3.

The locking device 10 includes a body 12 having a first portion or base portion 14, and a second portion or housing 16. The first and second portions 14 and 16 may be formed as one-piece as shown or formed as multiple pieces and coupled in any suitable manner, such as welding. The first portion 14 includes an opening 18 (FIG. 9) extending therethrough. A connecting member 20, such as a hitch ball is located to extend through the opening 18 for securing to the base portion 14. The hitch ball 20 may be any suitable size to be received in the socket of the trailer hitch coupler or the like to prevent another hitch ball from being coupled to the trailer. The hitch ball 20 has a spherical upper end 22 and a lower portion 24. The lower portion 24 has threads 26 on an outer surface thereof that threadably engages threads 28 on an inner surface of the opening 18 to secure the hitch ball 20 to the base portion 14 as shown in FIG. 14. Alternatively, the hitch ball 20 may be integrally formed with the base portion 14, press fit to the base portion 14, welded to the base portion, etc.

Figure 1:
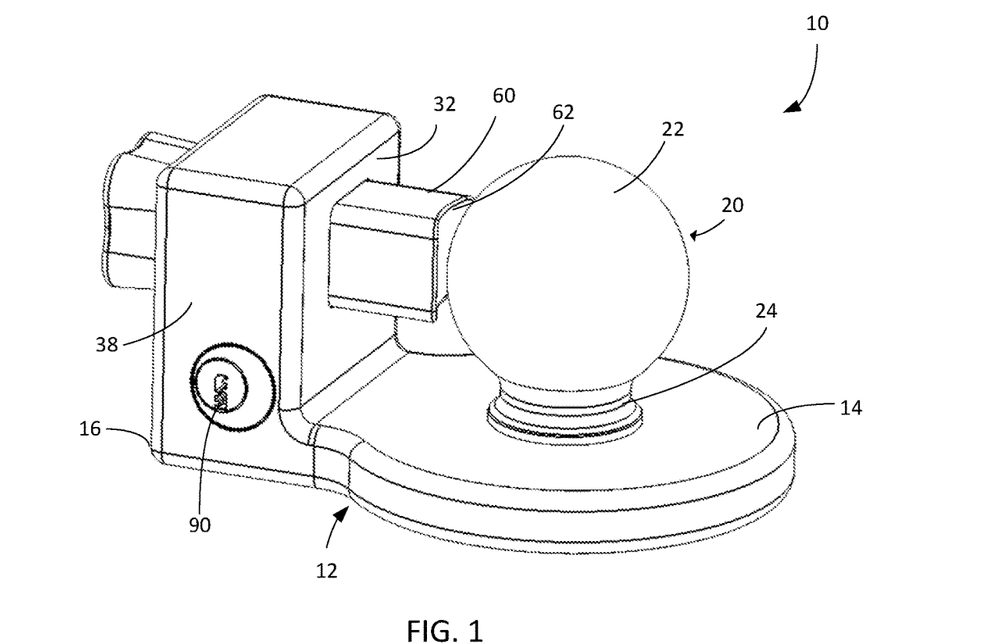
FIG. 1 is a perspective view of an exemplary trailer hitch coupler locking device.
Figure 2:
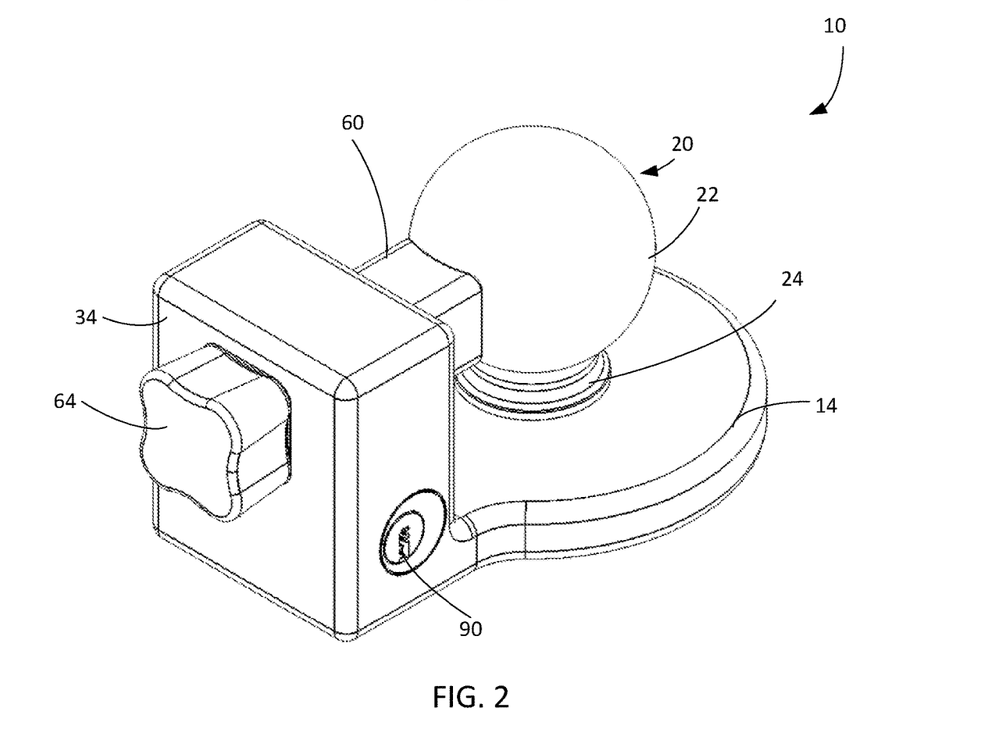
FIG. 2 is another perspective view of the locking device.
Figure 3:
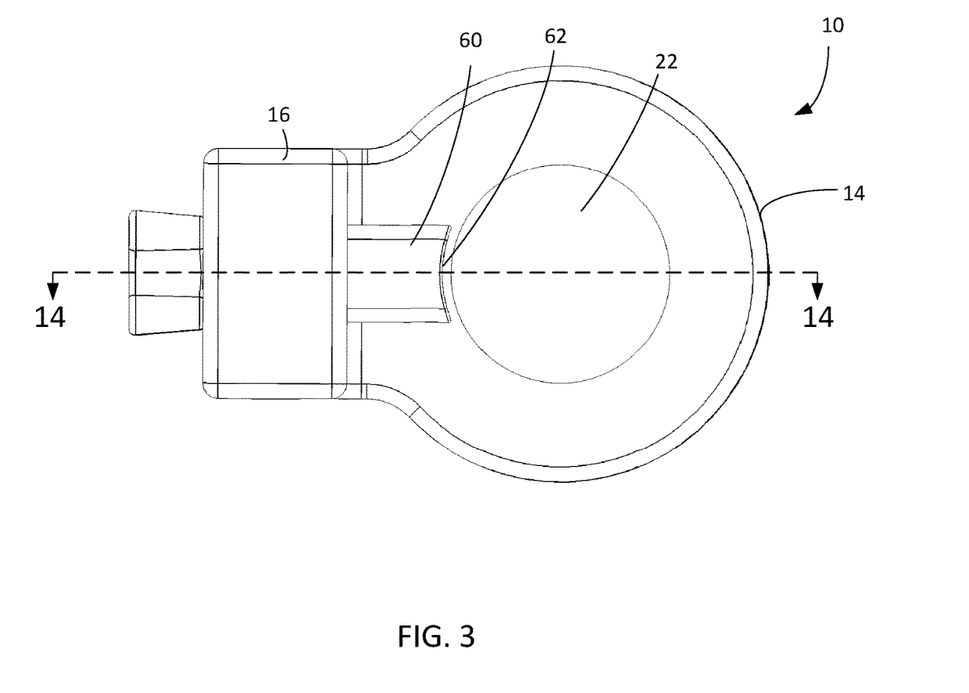
FIG. 3 is a top view of the locking device.
Figure 4:
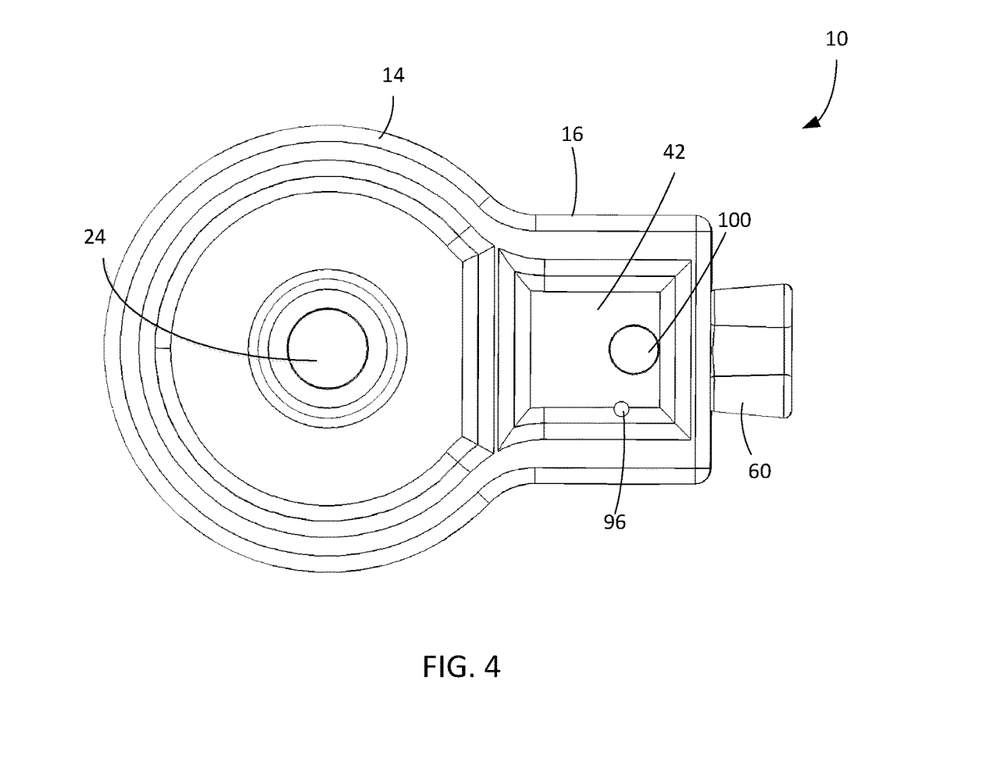
FIG. 4 is a bottom view of the locking device.
Figure 5:
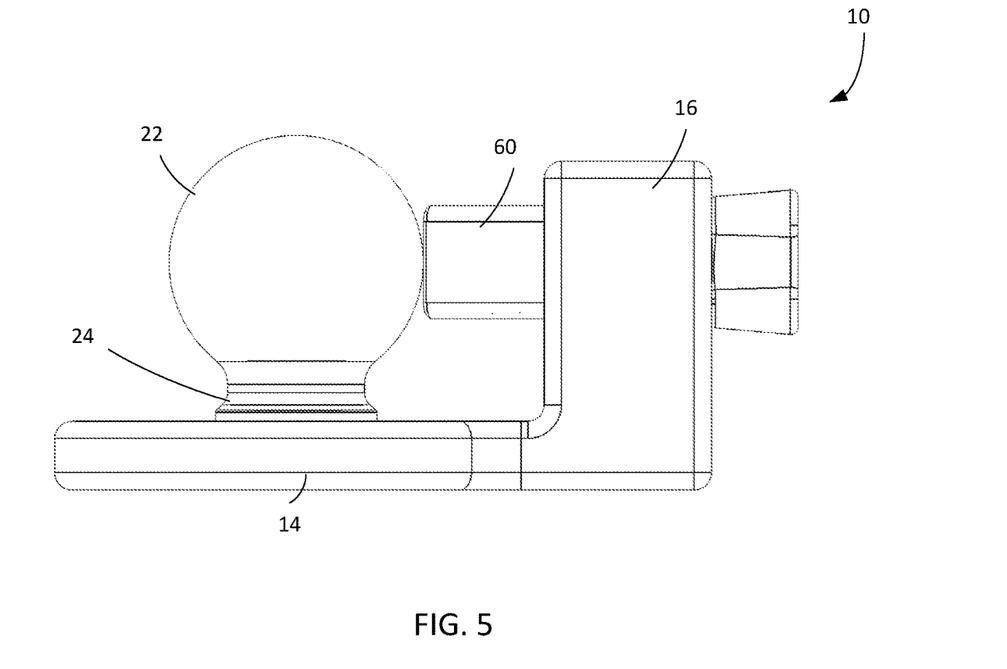
FIG. 5 is a right side view of the locking device.
Figure 6:
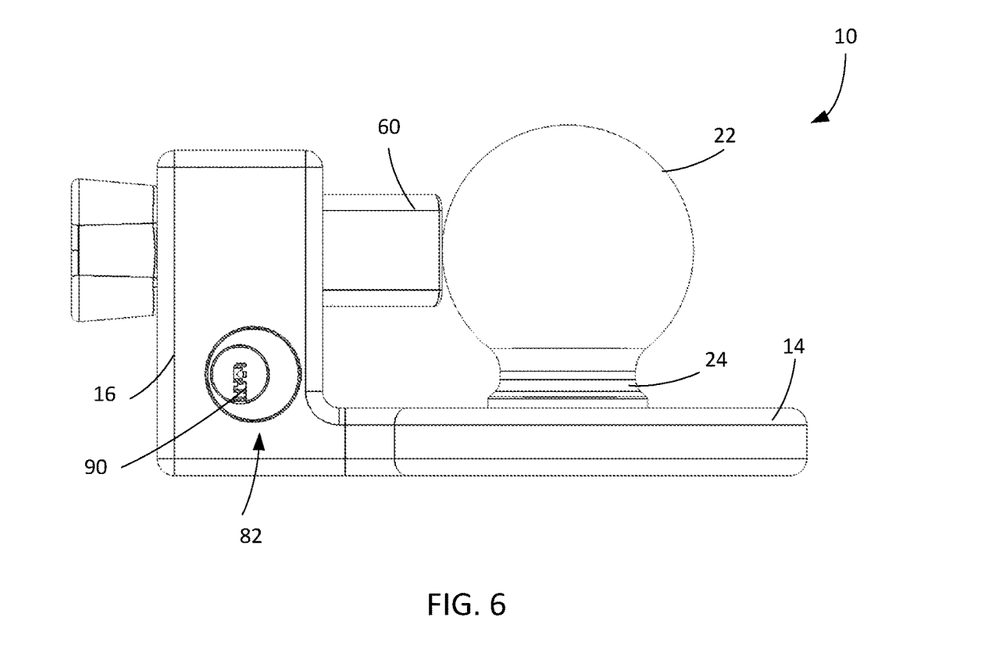
FIG. 6 is a left side view of the locking device.
Figure 7:
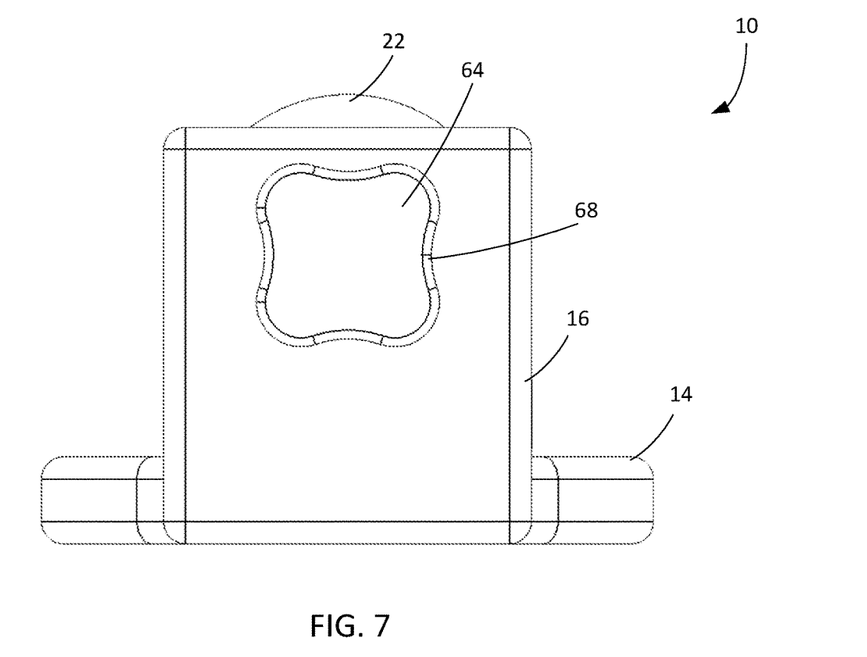
FIG. 7 is a back view of the locking device.
Figure 8:
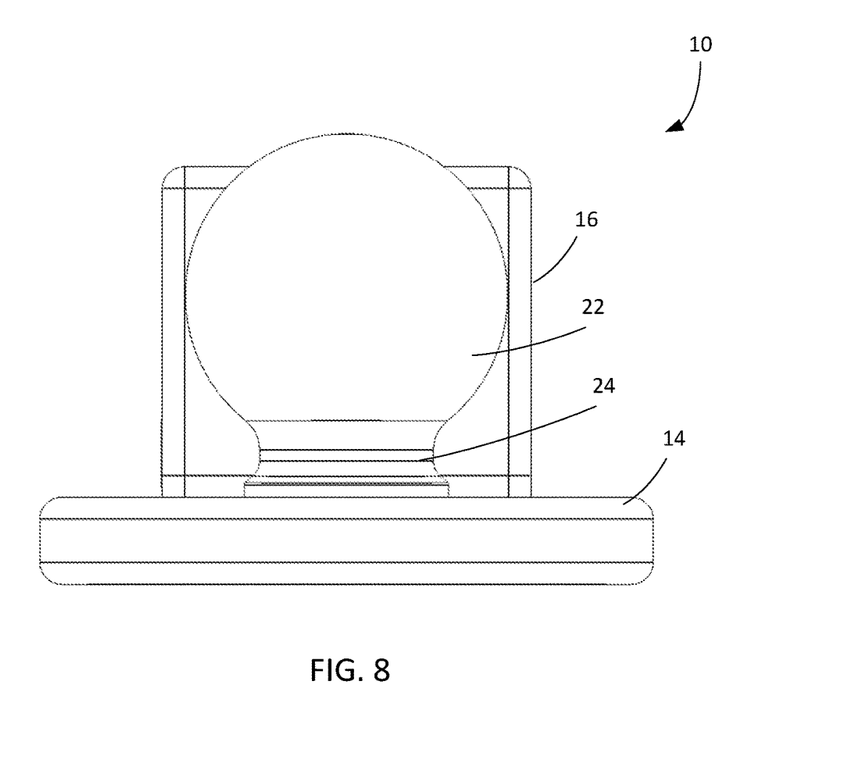
FIG. 8 is a front view of the locking device.
Figure 9:
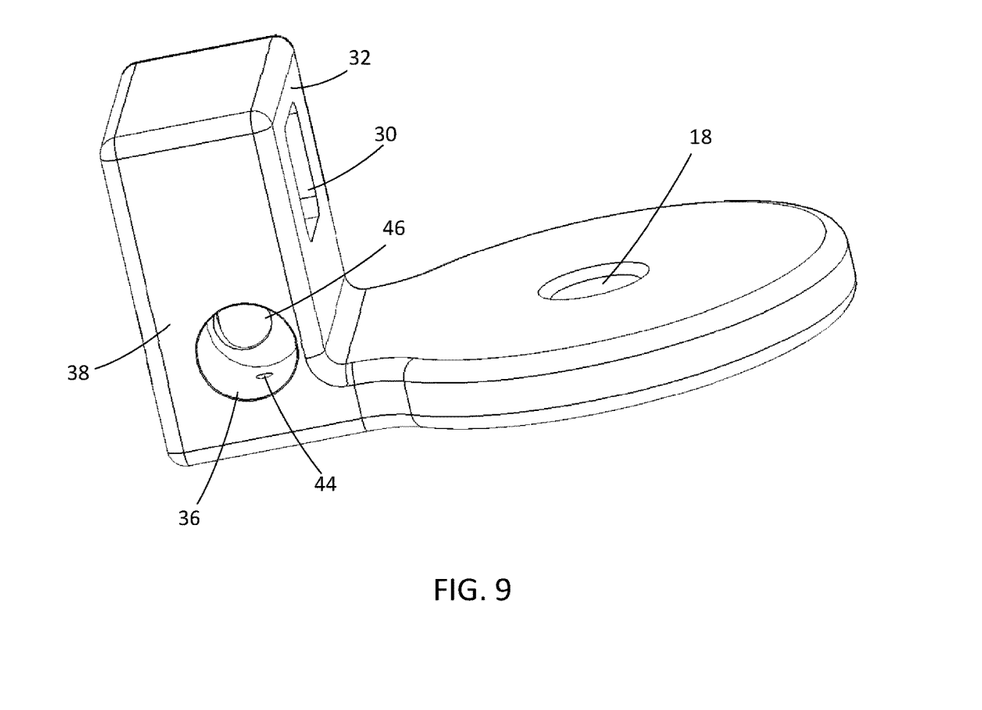
FIG. 9 is a perspective view of a body of the locking device.
Figure 10:
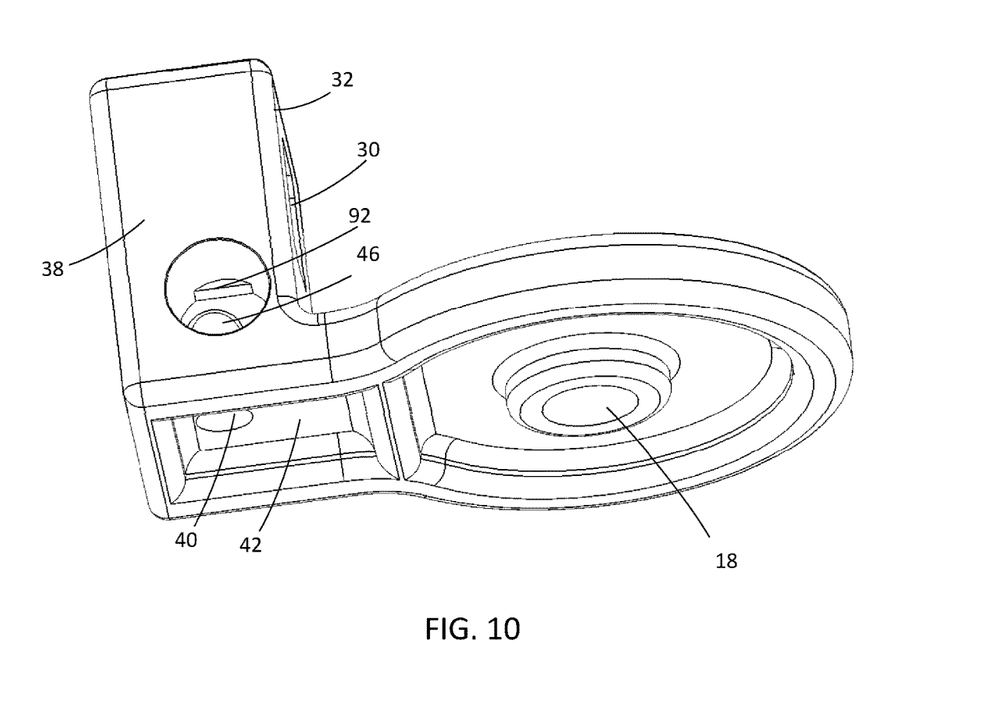
FIG. 10 is another perspective view of the body.

The second portion 16 extends upward in the same direction as the hitch ball 20 and is axially spaced from the hitch ball. The second portion 16 is substantially rectangular in shape, although the second portion 16 may be any suitable shape. As shown in FIGS. 9 and 10, the second portion 16 includes a plurality of openings extending through and into the second portion from the sides. The second portion 16 includes a first opening 30 extending through the second portion 16 from a front side 32 facing the hitch ball 20 to a back side 34, a second opening 36 extending into the second portion 16 from a left side 38, a third opening 40 extending from a bottom 42 of the second portion 16 into the first opening 30 intersecting the first opening 30, and a fourth opening 44 extending from the bottom 42 into the second opening 36 intersecting the second opening 36. The second opening 36 has a reduced diameter portion 46 that extends into the third opening 40 intersecting the third opening 40. The second opening 36 is perpendicular to the first opening 30, and the third and fourth openings 40 and 44 are parallel to one another and perpendicular to the first and second openings 30 and 36.

Figure 11:
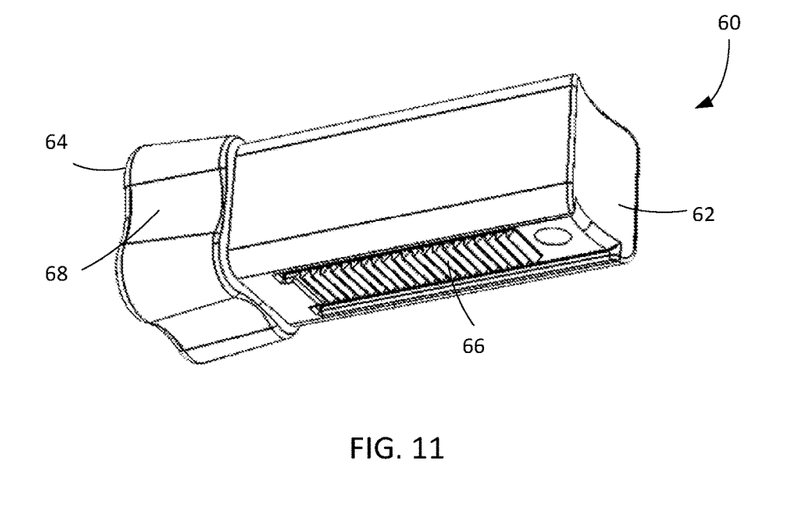
FIG. 11 is a perspective view of an elongate member of the locking device.

Referring additionally to FIG. 11, the locking device also includes an elongate member 60 extending through the first opening 30. The elongate member 60 is movable towards and away from the hitch ball 20 in a longitudinal direction. The elongate member's 60 movement is not limited in the longitudinal direction away from the hitch ball 20 when the device is unlocked, and may be removable from the second portion 16. For example, the elongate member 60 is movable from a first position where a first end 62 is proximate the hitch ball 20 to hold the trailer socket between the first end 62 and the hitch ball 20, and a second position where the first end 62 is spaced from the hitch ball 20 to allow the trailer socket to be moved away from the locking device 10.

The elongate member 60 may be a tubular member that is substantially solid. The elongate member 60 may have a substantially rectangular cross-sectional shape with rounded corners that is complimentary to the shape of the first opening 30 to minimize lateral and rotational movement of the elongate member 60 relative to the second portion 16. The elongate member 60 has a first end 62, a second end 64, and a ratchet surface 66 having a plurality of teeth formed on an underside of the elongate member 60 facing the bottom 42 of the second portion 16. The first end 62 may be concave to correspond to the spherical upper end 22, and the second end 64 may have a cross-sectional dimension greater than the size of the first opening 30 to serve as a stop for the elongate member 60 to limit the movement of the elongate member 60 in the longitudinal direction towards the hitch ball 20. For example, the second end 64 may diverge outward to the cross-sectional dimension greater than the size of the first opening 30. The second end 64 may also have a plurality of finger grips 68 formed around its periphery, for example by a substantially cloverleaf shape of the second end 64.

Figure 12:
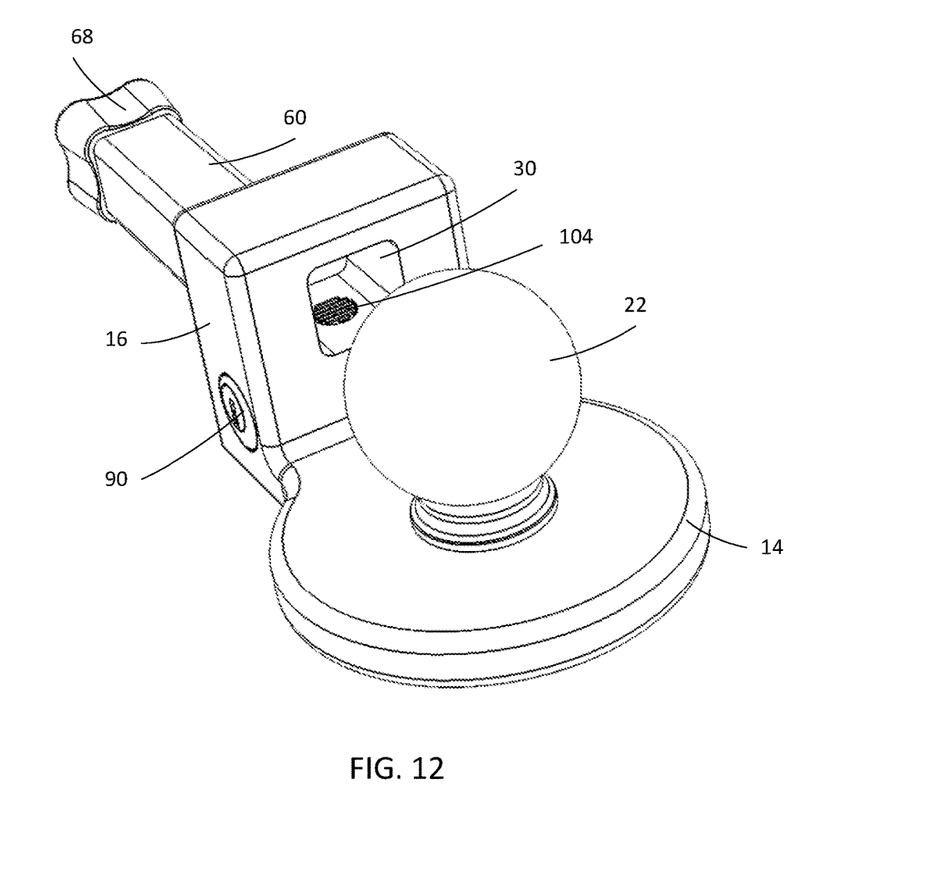
FIG. 12 is a perspective view of the locking device with the elongate member removed.
Figure 13:
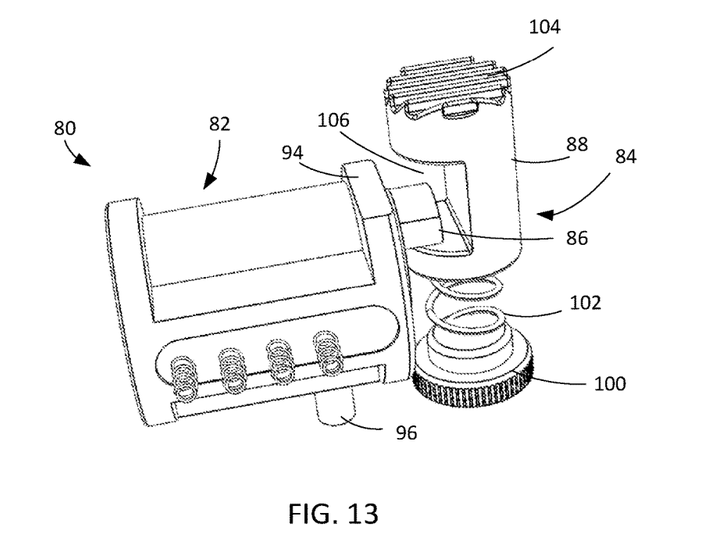
FIG. 13 is a perspective view of a lock assembly of the locking device.

Referring additionally to FIGS. 12 and 13, the locking device also includes a lock assembly 80 disposed within and secured to the second portion 16 that is actionable, for example by a key, to block and allow movement of the elongate member 60. The lock assembly 80 includes a lock mechanism 82 disposed in the second opening 36 and a ratchet assembly 84 disposed in the third opening 40. When installed in the second portion 16, the elongate member 60 and lock mechanism 82 have longitudinal axes perpendicular to one another, and the lock mechanism 82 and the ratchet assembly 84 also have longitudinal axes perpendicular to the axis of the elongate member 60. By providing a stationary lock mechanism separate from the elongate member, no external forces are applied to the lock mechanism thereby reducing wear.

The lock mechanism 82 may be any suitable lock mechanism, such as a cylindrical lock having a cam 86 configured to engage a ratchet member 88 of the ratchet assembly 84 to move the ratchet member away from the elongate member 60, and a keyway 90 located at the end of the lock mechanism 82 for receiving an authorized key to allow the lock mechanism to be actuated to move the cam 86. The cam 86 extends through the reduced diameter portion 46 of the second opening 36 and into the third opening 40 of the second portion 16 to engage the ratchet member 88.

To install the lock mechanism 82 in the second portion 16, the lock mechanism 82 is inserted into the second opening 36 and aligned within the opening 36 by an alignment member 92 that mates with a flat 94 on the lock mechanism 82. The interaction between the alignment member 92 and flat 94 serve to align the lock mechanism 82 and prevent rotation of the lock mechanism relative to the second portion 16.

The lock mechanism 82 is then secured to the second portion 16 by a pin 96 that prevents removal of the lock mechanism and longitudinal movement of the lock mechanism 82 relative to the second portion 16 while allowing components within the lock mechanism to rotate. The pin 96 is inserted into the fourth opening 44 in the second portion 16 and then into an opening in the bottom of the lock mechanism 82 to prevent longitudinal movement and removal of the lock mechanism 82. The pin 96 is held in the fourth opening 44 and the opening in the lock mechanism 82 in any suitable manner, such as by a press fit, and is inserted into the opening 44 until the bottom of the pin 96 is flush with the bottom 42 of the second portion 16. The pin 96 may be made of any suitable material, such as metal.

As shown in FIG. 13, the ratchet assembly 84 includes the ratchet member 88, a cap 100 configured to be secured to the second portion 16, and a biasing member 102, such as a spring, having ends seated against the ratchet member 88 and the cap 100. The ratchet member 88 is a substantially c-shaped member having a ratchet surface 104 having a plurality of teeth on a top portion thereof for engaging the ratchet surface 66 on the bottom of the elongate member 60. The ratchet member 88 is biased against the ratchet surface 66 of the elongate member 60 by the biasing member 102 such that the ratchet surface 104 extends into the first opening 30 as shown in FIG. 12.

To install the ratchet assembly 84 in the second portion 16, the ratchet member 88 is inserted into the second opening 40 and oriented so that the counter 106 of the ratchet member 88 faces the reduced diameter portion 46 of the second opening 36. The biasing member 102 is then inserted into the third opening 40, and then the cap 100 is inserted into the third opening 40 to hold the biasing member 102 and ratchet member 88 in the opening. The cap 100 is held in the third opening 40 in any suitable manner, such as by a press fit. The cap 100 is inserted into the third opening 40 until the bottom of the cap 100 is flush with the bottom 42 of the second portion 16. The cap 100 may be any suitable material, such as metal.

Figure 15:
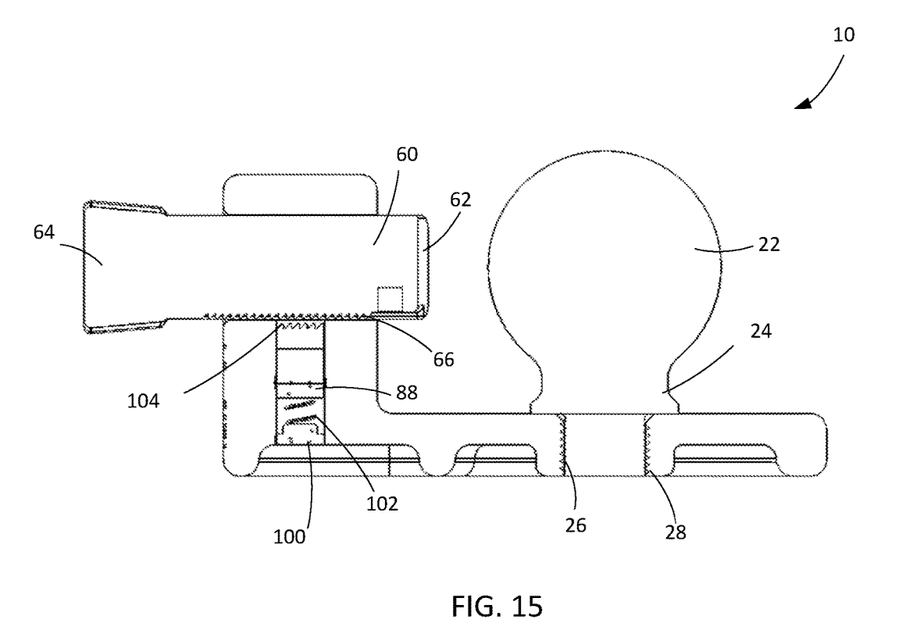
FIG. 15 is a cross-sectional view of the locking device in an unlocked position.

Turning now to FIGS. 14 and 15, an exemplary method of securing the locking device 10 to the trailer socket when the trailer is being stored or otherwise unattended is described. When not in use, the elongate member 60 is in the first position where the end 62 of the elongate member is proximate the hitch ball 20, and is held in the first position by the engagement of the ratchet surfaces 66 and 104. This prevents the elongate member 60 from inadvertently being removed from the opening 30. Alternatively, due to the length of the ratchet surface 66, it will be appreciated that the locking device 10 could be stored with the elongate member in many different positions, such as with the elongate member 60 in the position shown in FIG. 15, and still prevent inadvertent removal of the elongate member, provided that the ratchet surfaces 66 and 104 are engaged with one another.

To unlock the locking device 10 to couple to the socket, a key is inserted into the keyway 90 and rotated. Rotation of the key causes the cam 86 to move the ratchet member 88 downward against the force of the biasing member 102. As the ratchet member 88 is moved downward, the ratchet surface 104 is disengaged from the ratchet surface 66 and the ratchet member 88 is moved out of the first opening 30. The elongate member 60 can then be moved in the longitudinal direction to the second position, for example by a user gripping the finger grips 68 and moving the elongate member 60 away from the hitch ball 20. Optionally, while the elongate member 60 is away from the hitch ball 20, the user may turn the key to move the cam 86 allowing the biasing member 102 to move the ratchet member back to is first position where the ratchet surface 104 engages the ratchet surface 66.

With the elongate member 60 moved away from the hitch ball 20, the hitch ball 20 can be inserted into the trailer socket until the hitch ball 20 abuts an inner surface of the socket. Once the trailer socket is positioned over the hitch ball 20, the elongate member 60 is moved in the longitudinal direction to the first position, for example by moving the elongate member 60 via the finger grips 68. The elongate member 60 is moved in the longitudinal direction until the portion of the second end 64 with the cross-sectional dimension greater than the size of the first opening 30 abuts the opening 30 and/or until the first end 62 contacts the outer surface of the socket. In this manner the socket is held between the elongate member 60 and the hitch ball 20.

Although certain embodiments have been shown and described, it is understood that equivalents and modifications falling within the scope of the appended claims will occur to others who are skilled in the art upon the reading and understanding of this specification.

What is claimed is:

1. A trailer hitch coupler locking device configured to be connected to a socket of a trailer hitch coupler, the locking device including:
   a body having a first portion and a second portion;
   a connecting member extending from the first portion;
   an elongate member extending through a first opening in the second portion, the elongate member having a first ratchet surface formed thereon; and
   a lock assembly disposed within the second portion and including a lock mechanism and a ratchet member having a second ratchet surface,
   wherein the lock mechanism is configured to move the ratchet member from a first position where the second ratchet surface is engaged with the first ratchet surface to a second position away from the elongate member where the first and second ratchet surfaces are disengaged,
   wherein the elongate member is movable from a first position where an end of the elongate member is proximate the connecting member to hold the trailer socket between the end of the elongate member and the connecting member, and a second position where the end of the elongate member is spaced from the connecting member to allow the trailer socket to be moved away from the locking device,
   wherein the lock mechanism is disposed in a second opening in the second portion perpendicular to the first opening through which the elongate member extends, and
   wherein the ratchet member is disposed in a third opening in the second portion perpendicular to the first opening through which the elongate member extends and perpendicular to the second opening.

2. The locking device according to claim 1, wherein the third opening intersects the first opening such that in the first position the ratchet member extends through the third opening into the first opening, and is movable to the second position out of the first opening.

3. The locking device according to claim 1, wherein the first portion has an opening extending therethrough, and wherein the connecting member includes threads that mate with threads in the opening to secure the connecting member to the first portion.

4. The locking device according to claim 1, wherein the connecting member is a hitch ball having a spherical upper end and a lower portion.

5. The locking device according to claim 1, wherein the lock assembly additionally includes a biasing member biasing the ratchet member in the first position and a cap secured to the third opening, wherein the cap and the ratchet member serve as seats for the biasing member.

6. The locking device according to claim 1, wherein the first ratchet surface is formed on an underside of the elongate member.

7. The locking device according to claim 1, wherein the lock mechanism is a cylindrical lock having a cam configured to engage the ratchet member to move the ratchet member away from the elongate member.

8. The locking device according to claim 7, wherein the lock mechanism is secured in the second portion to prevent longitudinal movement of the lock mechanism relative to the second portion.

9. The locking device according to claim 1, wherein the elongate member has a second end larger than the first opening to serve as a stop for the elongate member.

10. The locking device according to claim 9, wherein the second end of the elongate member has a plurality of finger grips formed around a periphery of the elongate member.

11. A trailer hitch coupler locking device configured to be connected to a socket of a trailer hitch coupler, the locking device including:
   a body having a base and a housing;
   a connecting member extending from the base;
   an elongate member extending through an opening in the housing and having a ratchet surface formed on a side thereof, the elongate member being movable relative to the housing; and
   a lock assembly disposed within the housing and including a lock mechanism and a ratchet member having a ratchet surface, the ratchet member being biased against the ratchet surface of the elongate member and being movable away from the elongate member to allow movement of the elongate member,
   wherein the elongate member and lock mechanism have longitudinal axes perpendicular to one another.

12. The locking device according to claim 11, wherein the elongate member has an end larger than the opening in the housing to limit the movement of the elongate member towards the connecting member.

13. The locking device according to claim 11, wherein the elongate member has an end having a plurality of finger grips formed around a periphery of the elongate member.

14. The locking device according to claim 11, wherein the connecting member is a hitch ball having a spherical upper end and a threaded lower portion configured to engage threads in the base portion.

15. A trailer hitch coupler locking device configured to be connected to a socket of a trailer hitch coupler, the locking device including:
   a body having a base portion and a housing, the housing having first and second openings perpendicular to one another;
   a connecting member extending from the base;
   an elongate member extending through the first opening in the housing; and
   a lock assembly disposed within the housing, the lock assembly including a lock mechanism disposed in the second opening in the housing and a ratchet member biased against the elongate member and being movable away from the elongate member to allow movement of the elongate member,
   wherein the ratchet member is disposed in a third opening in the housing perpendicular to the first and second openings.

16. The locking device according to claim 15, wherein the third opening intersects the first opening such that the ratchet member is biased to extend through the third opening into the first opening, and is movable out of the first opening away from the elongate member.

17. The locking device according to claim 15, wherein the lock assembly additionally includes a biasing member biasing the ratchet member against the elongate member and a cap secured to the third opening, wherein the cap and the ratchet member serve as seats for the biasing member.

18. The locking device according to claim 15, wherein the elongate member includes a first ratchet surface and the ratchet member includes a second ratchet surface.

19. The locking device according to claim 18, wherein the first ratchet surface is formed on an underside of the elongate member.

20. The locking device according to claim 15, wherein the lock mechanism is a cylindrical lock having a cam configured to engage the ratchet member to move the ratchet member away from the elongate member.

\* \* \* \* \*